US008077834B2

(12) United States Patent
Zhao

(10) Patent No.: US 8,077,834 B2
(45) Date of Patent: Dec. 13, 2011

(54) TELEPHONE AND METHOD FOR ROUTING A TELEPHONE CALL IN A TELECOMMUNICATIONS NETWORK

(75) Inventor: Wei Zhao, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

(21) Appl. No.: 12/607,097

(22) Filed: Oct. 28, 2009

(65) Prior Publication Data

US 2010/0048181 A1 Feb. 25, 2010

Related U.S. Application Data

(63) Continuation of application No. 10/701,897, filed on Nov. 5, 2003, now Pat. No. 7,627,095.

(51) Int. Cl.
*H04M 1/64* (2006.01)
*H04M 3/42* (2006.01)
*H04M 7/00* (2006.01)

(52) U.S. Cl. ............ 379/88.01; 379/202.01; 379/220.01

(58) Field of Classification Search ................ 379/88.01
See application file for complete search history.

(56) References Cited

U.S. PATENT DOCUMENTS 5,805,672 A * 9/1998 Barkat et al. ............... 379/88.03
5,946,386 A 8/1999 Rogers et al.
6,038,305 A 3/2000 McAllister et al.
6,058,415 A 5/2000 Polcyn
6,226,532 B1 * 5/2001 Kim et al. ..................... 455/563
6,233,343 B1 * 5/2001 Muranami et al. .............. 381/96
6,263,216 B1 * 7/2001 Seydoux et al. .............. 455/564
6,393,304 B1 * 5/2002 Meche .......................... 455/563
6,397,079 B1 * 5/2002 Shimoda et al. .............. 455/557
6,404,858 B1 6/2002 Farris et al.
6,526,292 B1 * 2/2003 Henry, Jr. ...................... 455/563
6,584,439 B1 * 6/2003 Geilhufe et al. ............. 704/270
6,668,043 B2 12/2003 Hyziak et al.
6,697,455 B2 * 2/2004 Krofchalk .................. 379/88.03
6,757,544 B2 6/2004 Rangarajan et al.
6,785,366 B1 * 8/2004 Nobuta et al. ............. 379/88.03
6,788,767 B2 * 9/2004 Lambke ..................... 379/88.01
6,807,434 B1 * 10/2004 Yang .......................... 455/569.1
6,845,251 B2 * 1/2005 Everhart et al. ............... 455/563
6,999,564 B1 2/2006 Thomas
7,260,187 B1 * 8/2007 McAllister ................. 379/88.04
7,283,964 B1 * 10/2007 Geilhufe et al. ............. 704/277
7,526,279 B1 * 4/2009 Fujisaki ..................... 455/414.1
7,532,879 B1 * 5/2009 Fujisaki ..................... 455/414.1
7,627,095 B2 * 12/2009 Zhao .......................... 379/88.01
2003/0041048 A1 2/2003 Balasuriya
2003/0147518 A1 8/2003 Albal et al.
2003/0153364 A1 8/2003 Osann, Jr.
2005/0094778 A1 5/2005 Zhao

* cited by examiner

*Primary Examiner* — Joseph T Phan
(74) *Attorney, Agent, or Firm* — Cantor Colburn LLP

(57) ABSTRACT

A telephone and a method for routing a telephone call using the telephone is provided. The telephone includes a microprocessor and a transceiver coupled to the microprocessor. The telephone further includes a voice recognition unit coupled to the microprocessor. The unit is further configured to determine when the user is speaking proximate the unit and to generate a match signal when the user is speaking. The microprocessor is configured to generate a command signal to induce the transceiver to transmit a voice mailbox routing signal to a telephone switching center upon receipt of the match signal from the unit.

1 Claim, 2 Drawing Sheets

TELEPHONE AND METHOD FOR ROUTING A TELEPHONE CALL IN A TELECOMMUNICATIONS NETWORK

CROSS-REFERENCE TO RELATED APPLICATIONS

This application is a continuation of U.S. patent application Ser. No. 10/701,897 filed Nov. 5, 2003, the contents of which are incorporated herein by reference in their entirety.

FIELD OF INVENTION

The invention relates to a telephone and a method for routing a telephone call using the telephone in a telecommunications network.

BACKGROUND OF INVENTION

Known telecommunication networks allow a voice message from a telephone call initiator to be stored in a recipients voice mailbox. Generally, a voice message from a telephone call initiator will be stored in the recipient's voice mailbox when the recipient's telephone is being used for another telephone call. Many times, it is also desirable to route the initiator's telephone call to the recipients voice mailbox even when the recipient is not using their telephone. For example, when the intended recipient is speaking to someone in a meeting, the recipient may not want to be interrupted by a telephone call at that time. Accordingly, there is a need for a telephone and a method related thereto for routing a telephone call to a recipient's voice mailbox when the intended recipient is speaking.

SUMMARY OF INVENTION

The foregoing problems and disadvantages are overcome by a telephone and method related thereto in accordance with the exemplary embodiments disclosed herein.

A telephone in accordance with exemplary embodiments includes a microprocessor and a transceiver coupled to the microprocessor. The telephone further includes a voice recognition unit coupled to the microprocessor. The unit is configured to determine when a user is speaking proximate the unit and generates a match signal when the user is speaking. The microprocessor is configured to generate a command signal to induce the transceiver to transmit a voice mailbox routing signal to a telephone switching center upon receipt of the match signal from the unit.

A method for routing a telephone call within a telecommunications network in accordance with exemplary embodiments includes receiving a telephone call from a first telephone being directed to a second telephone. The method further includes determining if a user proximate the second telephone is speaking using a voice recognition unit in the second telephone. Finally, the method includes a routing a telephone call from the first telephone to a voice mailbox associated with the second telephone when the user is speaking.

Other systems, methods and/or computer program products according to the embodiments will be or become apparent to one with skill in the art upon review of the following drawings and detailed description. It is intended that at all such additional systems, methods, and/or computer program products be within the scope of the present invention, and be protected by the accompanying claims.

BRIEF DESCRIPTION DRAWINGS

DESCRIPTION OF AN EMBODIMENT

Figure 1:
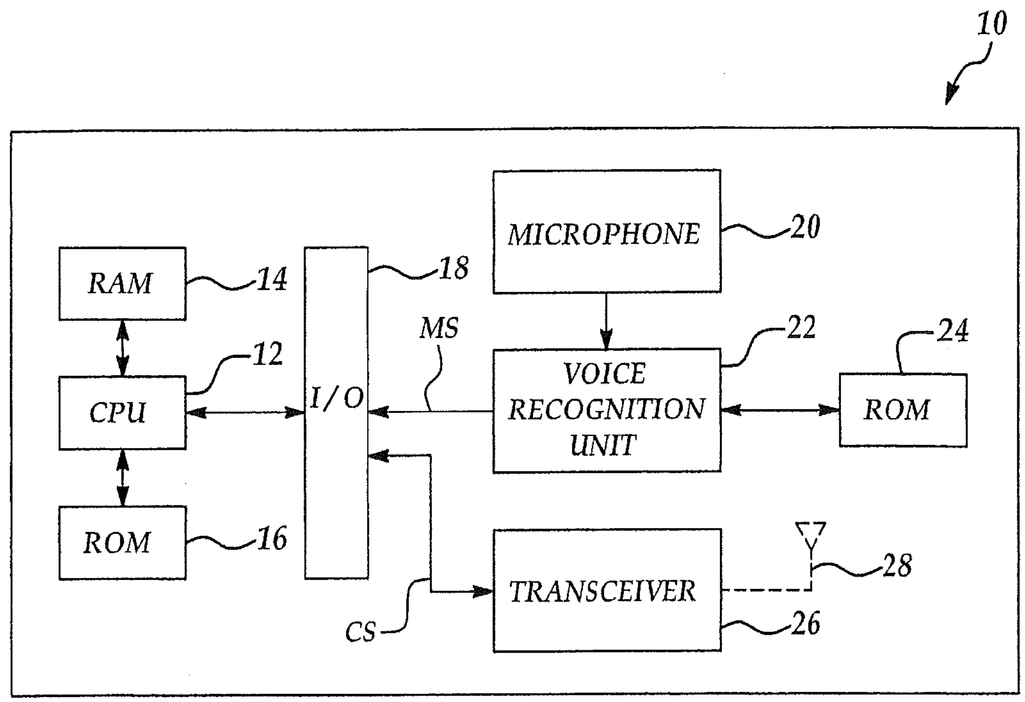
FIG. 1 is a block diagram of a telephone.

Referring to the drawings, identical reference numerals represent identical components in the various views. Referring to FIG. 1, a telephone 10 may comprise either a cellular telephone or a telephone that is hardwired into a telecommunications network. Telephone 10 includes a CPU 12, a random access memory (RAM) 14, a read-only memory (ROM) 16, and an input output (I/O) interface 18, a microphone 20, a voice recognition unit 22, a read-only memory (ROM) 24, and a transceiver 26. Telephone 10 may further include an antenna 28 for transmission of RF communication signals.

Figure 2:
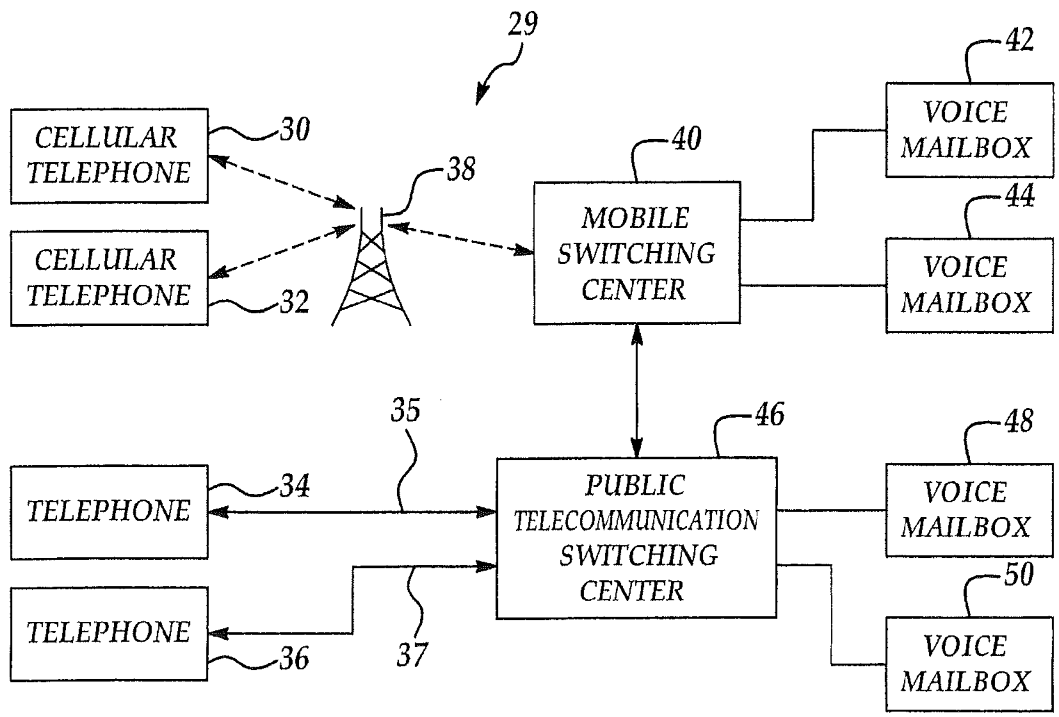
FIG. 2 is a block diagram of a telecommunications network.

Referring to FIGS. 1 and 2, microprocessor 12 is provided to control the transmission of voice and voice mailbox routing signals from telephone 10 through a telecommunications network 29. In particular, microprocessor 12 can monitor a match signal (discussed in further detail below) from voice recognition unit 22 to determine if unit 22 indicates that a user is speaking. When microprocessor 12 receives the match signal, microprocessor 12 can generate a command signal (CS) to induce transceiver unit 26 to transmit a voice mailbox routing signal over telecommunications network 29, explained in greater detail below.

As shown, microprocessor 12 communicates with various computer readable storage medium. The computer readable storage media preferably includes nonvolatile and volatile storage in a read-only memory ROM 16 and a random access memory RAM 14. The computer readable medium may be implemented using any of a number of known memory devices such as PROMs, EPROMs, EEPROMS, flash memory or any other electric, magnetic, optical or combination memory device capable of storing data, some of which represent executable instructions used by microprocessor 12. Microprocessor 12 may communicate with various components of telephone 10 via I/O interface 18.

Voice recognition unit 22 is provided to determine when a user of the telephone 10 is speaking when the user is not using telephone 10 for a telephone call. Voice recognition unit 22 may comprise a programmable microchip that recognizes predetermined spoken words by the user. The microchip may be programmed with software substantially similar to the SpeechStar Voice Verifier software manufactured by Voice Recognition Systems of Lexington Ky. to perform voice recognition functionality. Alternately, unit 22 may comprise the HM2007 speech recognition integrated circuit manufactured by Images SI Inc.

During initial use of voice recognition unit 22, unit 22 may be programmed by the user by placing unit 22 in a "learn mode" using a selector switch (not shown) coupled to unit 22. Thereafter, the user of telephone 10 can speak into a microphone 20 a predetermined set of words to generate voice signals that will thereafter be stored as keywords in ROM memory 24.

Thereafter, unit 22 may be placed in "word recognition" mode using the selector switch (not shown). In this mode, when unit 22 receives a voice signal from microphone 20, it searches the stored keywords in ROM 24. When a portion of the voice signal corresponds to a stored keyword, unit 22 can generate a match signal that is transmitted to microprocessor 12. Thus, when unit 22 generates the match signal it is determined that the user of telephone 10 is speaking. When the user is speaking, telephone calls directed to telephone 10 will be routed to a voice mail box associated with telephone 10 so that the user will not be disturbed by a phone call while they are speaking, as explained in greater detail below.

Transceiver 26 is provided to transmit a voice signal and a voice mailbox routing signal from telephone 10 over telecommunications network 29. A voice signal is defined as any transmitted signal representing one or more words spoken by the user of telephone 10. A voice mailbox routing signal is defined as a signal transmitted to either a Mobile Switching Center (MSC) 40 or a Public Telecommunications Switching Center (PTSC) 46 to cause a telephone call directed to telephone 10 be redirected to a voice mailbox associated with telephone 10. When telephone 10 comprises a cellular telephone, transceiver unit 26 comprises a radio-frequency (RF) transceiver unit for transmitting and receiving RF signals between telephone 10 and a cellular tower 38. Further, transceiver 26 may be coupled to an RF antenna 28 for transmitting and receiving RF signals. Alternately, when telephone 10 comprises a conventional hardwired telephone, transceiver 26 is replaced by a transceiver 26' which is physically coupled via a telephone line 35 to a PTSC 46. During operation, transceiver unit 26' may generate voice signals that are transmitted through telephone line 35 to PTSC 46.

Before explaining the method for routing of telephone calls in accordance with exemplary embodiments, the telecommunications network 29 will now be explained. Referring to FIG. 2, network 29 includes cellular telephones 30, 32, hardwired telephones 34, 36, cellular tower 38, Mobile Switching Center 40, Public Telecommunications Switching Center 46, and voicemail boxes 42, 44, 48, 50.

Cellular telephones 30, 32 are configured identical to telephone 10 and include a RF transceiver 26 configured to transmit and receive RF signals from a cellular tower 38. Further, hardwired telephones 34, 36 are configured identical as telephone 10 except that telephones 34, 36 each have a transceiver 26' (instead of RF transceiver 26) physically linked to PTSC 46 via telephone lines 35, 37, respectively. Further, telephones 34, 36 do not have antenna 28.

Cellular tower 38 is provided to receive voice signals and voice mailbox routing signals from cellular telephones 30, 32 and to retransmit the signals to MSC 40. Further, tower 38 is provided to receive voice signals from MSC 40 and to transmit voice signals to cellular phones 30, 32.

Mobile Switching Center 40 is provided to route telephone calls through telecommunications network 29. As shown, MSC 40 can receive voice signals and voice mailbox routing signals from cellular telephones 30, 32 via cellular tower 38 and can route the voice signals to one of following network components: (i) cellular tower 38 or other cellular towers (not shown), (ii) voice mailbox 42, (iii) voice mailbox 44, or (iv) PTSC 46.

Public Telecommunications Switching Center 46 is also provided to route telephone calls through telecommunications network 29. As shown, PTSC can receive voice signals and voice mailbox routing signals from telephones 34, 36 via telephone lines 35, 37, respectively, and then route the voice signals to one of the following network components: (i) MSC 40, (ii) voice mailbox 48, (iii) voice mailbox 50, (iv) telephone 34, or (v) telephone 36.

Voice mailboxes 48, 50 are provided to store voice messages from telephone call initiators that are directed to telephones 34, 36 when (i) telephones 34, 36 are being used by associated users, or (ii) telephones 34, 36 detect that associated users are speaking while not using telephones 34, 36 for telephone calls. Each of voice mailboxes 48, 50 may be stored in a computer server as known to those skilled in the art.

Voice mailboxes 42, 44 are provided to store voice messages from a telephone call initiators that are directed to cellular telephones 30, 32 when (i) telephones 30, 32 are being used by associated users, or (ii) telephones 30, 32 detect that associated users are speaking while not using telephones 30, 32 for telephone calls. Each of voice mailboxes 42, 44 may be stored in a computer server as known to those skilled in the art.

Figure 3A:
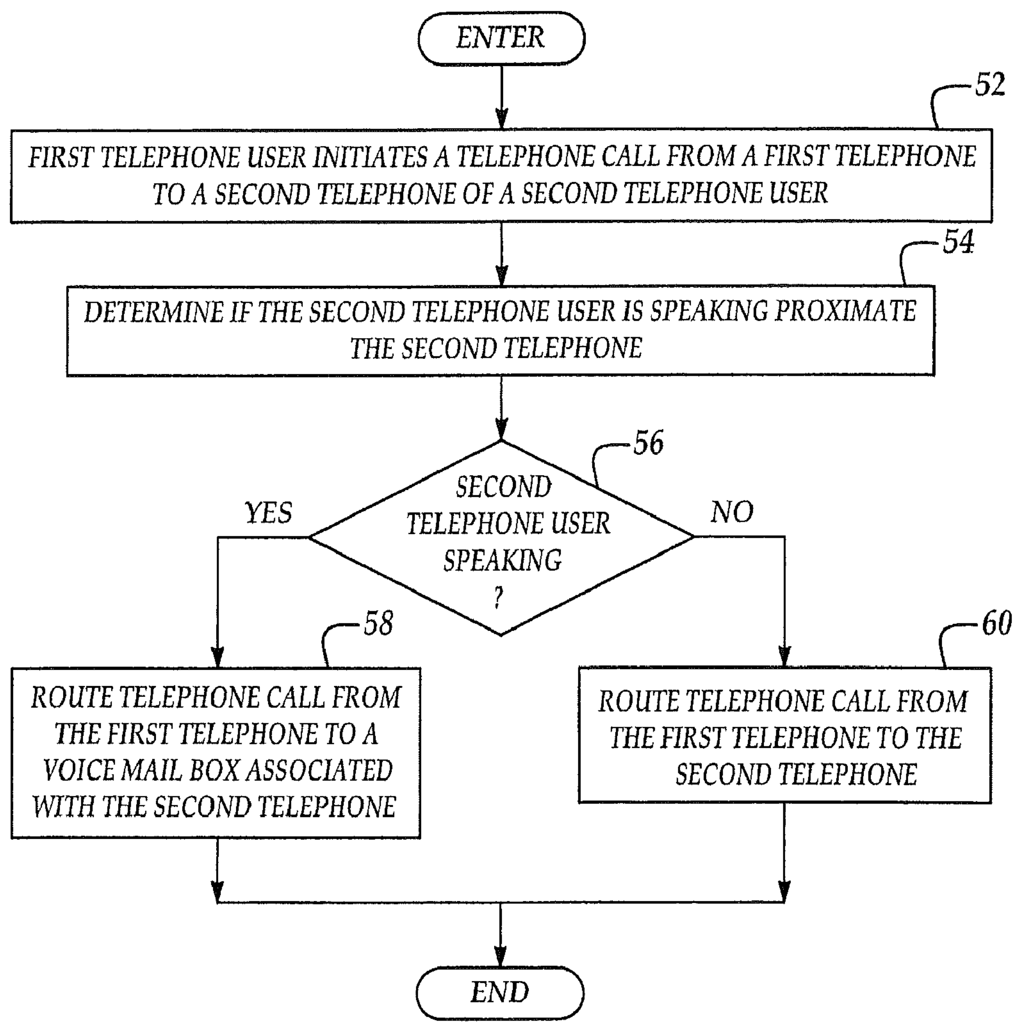
FIGS. 3A-3B are flowcharts of a method for routing a telephone call in a telecommunications network.
Figure 3B:
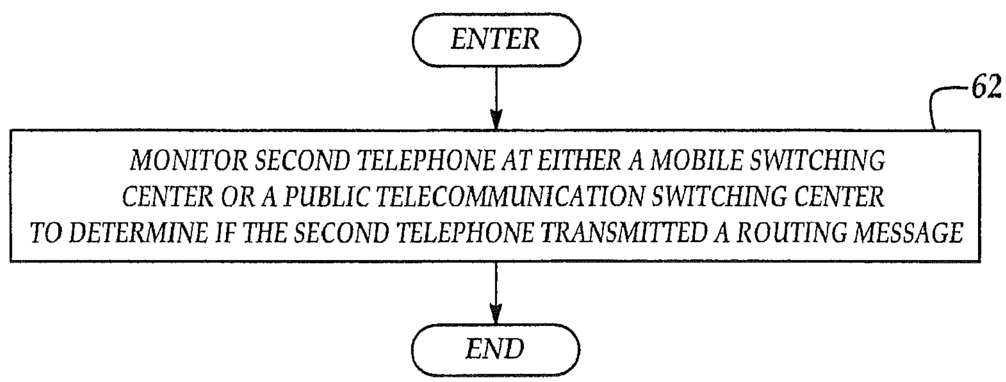

Referring to FIGS. 3A and 3B, a method for routing telephone calls in accordance with exemplary embodiments will now be explained. At step 52, a first telephone user initiates a telephone call from a first telephone to a second telephone of a second telephone user. For example, a telephone user of telephone 34 may dial the telephone number associated with cellular telephone 32 to initiate a telephone call.

Next at step 54, the telecommunications network 29 determines if the second telephone user is speaking proximate the second telephone. To implement said determining includes 54, a substep 62 may be performed. At substep 62, MSC 40 may monitor any voice mailbox routing signals from cellular telephone 32 to determine whether a user associated with telephone 32 is speaking.

Next at step 56, if the second telephone user is speaking proximate the telephone 32, the method advances to said determining includes 58. For example, if MSC 40 receives a voice mailbox routing signal from telephone 32 indicating the user of telephone 32 is speaking, the method advances to said determining includes 58.

Next at step 58, the telephone call is routed from the first telephone to a voice box associated with the second telephone. For example, the telephone call from telephone 34 may be routed through PTSC 46 and further routed through MSC 40 to voice mailbox 44 associated with cellular phone 32.

Returning again to step 56, if the second telephone user is not speaking proximate the telephone 32, the method advances to step 60. At step 60, the telephone call is routed from the first telephone to the second telephone. For example, the telephone call from telephone 34 may be routed through PTSC 46 and further routed through MSC 42 and cellular tower 38 to cellular telephone 32. After either of steps 58, 60 the telephone call routing method is completed.

Although the inventive method for routing telephone calls to a voice mailbox was explained with respect to a hardwired telephone (e.g. telephone 34) initiating a call to a cellular telephone (e.g. telephone 32), it should be understood that the inventive telephone call routing method could also be utilized when:

a cellular telephone (e.g. telephone 30) initiates a call to another cellular telephone (e.g. telephone 32);

(ii) a hardwired telephone (e.g. telephone 34) initiates a call to another hardwired telephone (e.g. telephone 36); or (iii) a cellular telephone (e.g. telephone 32) initiates a call to a hardwired telephone (e.g. telephone 34).

In the event a call initiator initiates a telephone call to a cellular telephone when a user of the cellular telephone is speaking proximate the telephone, MSC 40 would direct the call to the mailbox associated with the cellular telephone. Alternately, in the event a call initiator initiates a telephone call to a hardwired telephone when the user of the hardwired telephone is speaking proximate the telephone, PTSN 46 would direct the call to the mailbox associated with the hardwired telephone.

As discussed above, a telephone and a method for routing telephone calls within a telecommunications network represents a substantial advantage over known telephone systems. In particular, the exemplary telephone disclosed herein is able to detect when the user of the telephone is speaking (while not using the telephone), and thereafter transmit a voice mailbox routine signal to the telecommunications network to route incoming telephone calls to the user's voice mailbox. Thus, a user will not be disturbed by incoming telephone calls when they are speaking proximate the telephone.

While the invention is described with reference to an exemplary embodiment, it will be understood by those skilled in the art that various changes may be made an equivalence may be substituted for elements thereof without departing from the scope of the invention. In addition, many modifications may be made to the teachings of the invention to adapt to a particular situation without departing from the scope thereof. Therefore, is intended that the invention not be limited the embodiment disclosed for carrying out this invention, but that the invention includes all embodiments falling with the scope of the intended claims. Moreover, the use of the term's first, second, etc. does not denote any order of importance, but rather the term's first, second, etc. are us are used to distinguish one element from another.

I claim:

1. A method for routing a telephone call within a telecommunications network, comprising:

receiving a telephone call from a first telephone being directed to a second telephone;

determining if a user proximate the second telephone is speaking using a voice recognition unit in the second telephone; and routing the telephone call from the first telephone to a voice mail box associated with the second telephone when the user is speaking;

wherein the determining if the user proximate the second telephone is speaking includes:

comparing at least one word spoken proximate the second telephone to keywords stored in a memory of the voice recognition unit; and, indicating that the user proximate the second telephone is speaking when the comparison matches at least one of the words spoken proximate the second telephone to one of the stored keywords, wherein the indicating that the user proximate the second telephone is speaking includes generating a voice mailbox routing signal in the second telephone that is transmitted to a telephone switching center;

wherein the voice mailbox routing signal is transmitted to the telephone switching center when the second telephone is not transmitting a voice signal to the switching center;

wherein the voice mailbox routing signal is an RF voice mailbox routing signal.

* * * * *